US011078899B2

(12) United States Patent
Mou et al.

(10) Patent No.: US 11,078,899 B2
(45) Date of Patent: Aug. 3, 2021

(54) PORTABLE AIR CLEANING APPARATUS

(71) Applicant: Microjet Technology Co., Ltd., Hsinchu (TW)

(72) Inventors: Hao-Jan Mou, Hsinchu (TW); Ta-Wei Hsueh, Hsinchu (TW); Shih-Chang Chen, Hsinchu (TW); Li-Pang Mo, Hsinchu (TW); Ching-Sung Lin, Hsinchu (TW); Yung-Lung Han, Hsinchu (TW); Chi-Feng Huang, Hsinchu (TW); Hsuan-Kai Chen, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 551 days.

(21) Appl. No.: 16/035,986

(22) Filed: Jul. 16, 2018

(65) Prior Publication Data
US 2019/0056125 A1 Feb. 21, 2019

(30) Foreign Application Priority Data
Aug. 15, 2017 (TW) .................................. 106127623

(51) Int. Cl.
*B01D 53/02* (2006.01)
*F04B 45/047* (2006.01)
(Continued)

(52) U.S. Cl.
CPC .......... *F04B 45/047* (2013.01); *F04B 49/065* (2013.01); *F24F 1/04* (2013.01);
(Continued)

(58) Field of Classification Search
CPC .......... F04B 2205/09; F04B 2207/041; F04B 45/047; F04B 49/065; F24F 2110/64;
(Continued)

(56) References Cited

U.S. PATENT DOCUMENTS 6,454,834 B1 * 9/2002 Livingstone ........... B01D 53/04
55/385.3
2009/0007778 A1 1/2009 Zhang
(Continued)

FOREIGN PATENT DOCUMENTS

| CN | 2404039 Y | 11/2000 |
| CN | 103529167 A | 1/2014 |

(Continued)

OTHER PUBLICATIONS

Extended European Search Report for European Application No. 18183717.0, dated Jan. 17, 2019.

*Primary Examiner* — Christopher P Jones
(74) *Attorney, Agent, or Firm* — Birch, Stewart, Kolasch & Birch LLP

(57) ABSTRACT

A portable air cleaning apparatus includes a housing, an actuating and sensing device and an air cleaning unit. The housing includes an inlet through hole and an outlet through hole. The actuating and sensing module and the air cleaning unit are disposed inside the housing. The actuating and sensing module includes an actuating device and a sensor. The actuating device drives an external air to flow into an interior of the housing via the inlet through hole and discharge the air via the outlet through hole, so as to form an internal air flow. The sensor detects the internal air flow to generate an air-sensing result, such that the actuating and sensing module can accordingly control the air cleaning unit to turn on, turn off, or adjust cleaning intensity. Thus, the portable air cleaning apparatus can monitor and automatically clean the ambient air at the same time.

17 Claims, 8 Drawing Sheets

(51) Int. Cl.
| | |
|---|---|
| *F24F 1/04* | (2011.01) |
| *F24F 13/28* | (2006.01) |
| *F04B 49/06* | (2006.01) |
| *F24F 3/16* | (2021.01) |
| *F24F 11/77* | (2018.01) |
| *F24F 8/10* | (2021.01) |
| *F24F 8/192* | (2021.01) |
| *F24F 110/70* | (2018.01) |
| *F24F 110/66* | (2018.01) |
| *F24F 110/74* | (2018.01) |
| *F24F 110/65* | (2018.01) |
| *F24F 110/64* | (2018.01) |
| *F24F 110/72* | (2018.01) |
| *F24F 110/76* | (2018.01) |
| *F24F 8/20* | (2021.01) |
| *F24F 8/22* | (2021.01) |

(52) U.S. Cl.
CPC ............... *F24F 3/16* (2013.01); *F24F 8/10* (2021.01); *F24F 8/192* (2021.01); *F24F 11/77* (2018.01); *F24F 13/28* (2013.01); *F04B 2205/09* (2013.01); *F04B 2207/041* (2013.01); *F24F 8/20* (2021.01); *F24F 8/22* (2021.01); *F24F 2110/64* (2018.01); *F24F 2110/65* (2018.01); *F24F 2110/66* (2018.01); *F24F 2110/70* (2018.01); *F24F 2110/72* (2018.01); *F24F 2110/74* (2018.01); *F24F 2110/76* (2018.01); *F24F 2221/12* (2013.01)

(58) Field of Classification Search
CPC ............ F24F 2110/65; F24F 2110/66; F24F 2110/70; F24F 2110/72; F24F 2110/74; F24F 2110/76; F24F 8/10; F24F 8/192; F24F 8/20; F24F 8/22; Y02B 30/70
See application file for complete search history.

(56) References Cited

U.S. PATENT DOCUMENTS

| | | |
|---|---|---|
| 2016/0045854 A1 | 2/2016 | Hung et al. |
| 2018/0319256 A1* | 11/2018 | Stahl .................... B60H 3/0625 |

FOREIGN PATENT DOCUMENTS

| | | |
|---|---|---|
| CN | 205037459 U | 2/2016 |
| CN | 105674491 A | 6/2016 |
| CN | 105757818 A | 7/2016 |
| CN | 205383064 U | 7/2016 |
| CN | 205536156 U | 8/2016 |
| CN | 205957324 U | 2/2017 |
| CN | 206251548 U | 6/2017 |
| EP | 2568175 A1 | 3/2013 |
| JP | 2000-140688 A | 5/2000 |
| JP | 2001-263771 A | 9/2001 |
| JP | 2002-85929 A | 3/2002 |
| JP | 2005-69610 A | 3/2005 |
| JP | 2009-536087 A | 10/2009 |
| JP | 2016-75443 A | 5/2016 |
| JP | 3204517 U | 6/2016 |
| JP | 2017-13313 A | 8/2017 |
| JP | 2018-532119 A | 11/2018 |
| TW | M249662 U | 11/2004 |
| TW | M536335 U | 2/2017 |
| TW | M540932 U | 5/2017 |
| WO | WO 2015/171571 A2 | 11/2015 |
| WO | WO 2017/074258 A1 | 5/2017 |

* cited by examiner

PORTABLE AIR CLEANING APPARATUS

FIELD OF THE DISCLOSURE

The present disclosure relates to a portable air cleaning apparatus, and more particularly to a portable air cleaning apparatus utilizing a micropump and a sensor to monitor the circulating air flow and automatically clean the surrounding air.

BACKGROUND OF THE DISCLOSURE

Nowadays, the air pollution problems are becoming increasingly serious in our country and its neighboring regions. In particular, the concentration of fine suspended particles (PM 2.5) is often too high, and the public gradually develops habits of accessing real-time air quality monitoring data online at any time in daily life. There are various types of air cleaning apparatuses provided currently on the market and emphasized to have the effectiveness of eliminating the pollutants and purifying the air quality. However, in actual use, the consumers judge the result of air quality improvement by subjective sensory feelings. It is not clear what the actual improvement is. For example, many harmful substances in the air are colorless and odorless, such as fine suspended particles or carbon monoxide. If the air is not detected, the user cannot confirm whether the air cleaning apparatus has completely eliminated the harmful targets and cannot know the degree of elimination of the harmful targets.

In addition, the various types of air cleaning apparatuses currently provided on the market are mostly a fixed-type apparatus with a certain volume, heavy and can't be carried by users. Therefore, the air quality of the user's surrounding environment cannot be ensured to maintain anywhere and at any time. At the same time, most of the conventional air cleaning apparatuses don't have the function of monitoring the air quality. Although there are a small number of portable air cleaning devices provided on the current market, it is difficult to combine conventional air sensors with these portable air cleaning devices to form any portable air cleaning apparatus having the function of monitoring the air quality when it comes to sizes of the conventional air sensors. Therefore, there is a need of providing a portable air cleaning apparatus having a function of monitoring the air quality to solve the drawbacks in prior arts.

SUMMARY OF THE DISCLOSURE

The portable air cleaning apparatus of the present disclosure can solve the following problems existing in the prior art: (1) the conventional air cleaning apparatuses do not have the function of monitoring the air quality; (2) the conventional air sensors are too bulky to be used in combination with the conventional portable air cleaning apparatuses; and (3) the conventional air sensors have poor performance and are unstable with respect to detection efficiency.

In accordance with an aspect of the present disclosure, there is provided a portable air cleaning apparatus including a housing, an actuating and sensing module and an air cleaning unit. The housing includes an inlet through hole and an outlet through hole in communication with the external environment. The actuating and sensing module and the air cleaning unit are disposed inside the housing. The actuating and sensing module includes a microprocessor, at least one actuating device, at least one sensor and a transmission module. The actuating device drives air from an external environment to flow into an interior of the housing, via the inlet through hole and discharge the air via the outlet through hole, so as to form an internal air flow inside the housing. The sensor is disposed adjacent to the actuating device to sense the air of the internal air flow to generate at least one air-sensing value. The air cleaning unit is disposed adjacent to the actuating and sensing module to clean the air. The microprocessor is electrically connected to other components to receive the air-sensing value from the sensor and calculate the air-sensing value to generate an air-sensing result, so that the air cleaning unit is turned on, turned off or adjusted to operate at a cleaning intensity according to the air-sensing result.

Since the actuating device of the present disclosure has a miniaturized volume, the portable air cleaning apparatus of the present disclosure can be lightweight and suitable for the user to carry around. In addition, since the actuating device can continuously inhale a quantitative amount of the external air into the actuating and sensing module, a stable and consistent internal air flow is formed and detected by the sensor, so that the stability and accuracy of air detection are greatly improved. Moreover, by applying the above-mentioned innovative actuating and sensing module to the portable air cleaning apparatus, it is possible to monitor the air quality of the surrounding environment and automatically perform the air purification on the surrounding environment at the same time. Thus, the ambient air quality of the users is ensured to maintain anywhere and at any time.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
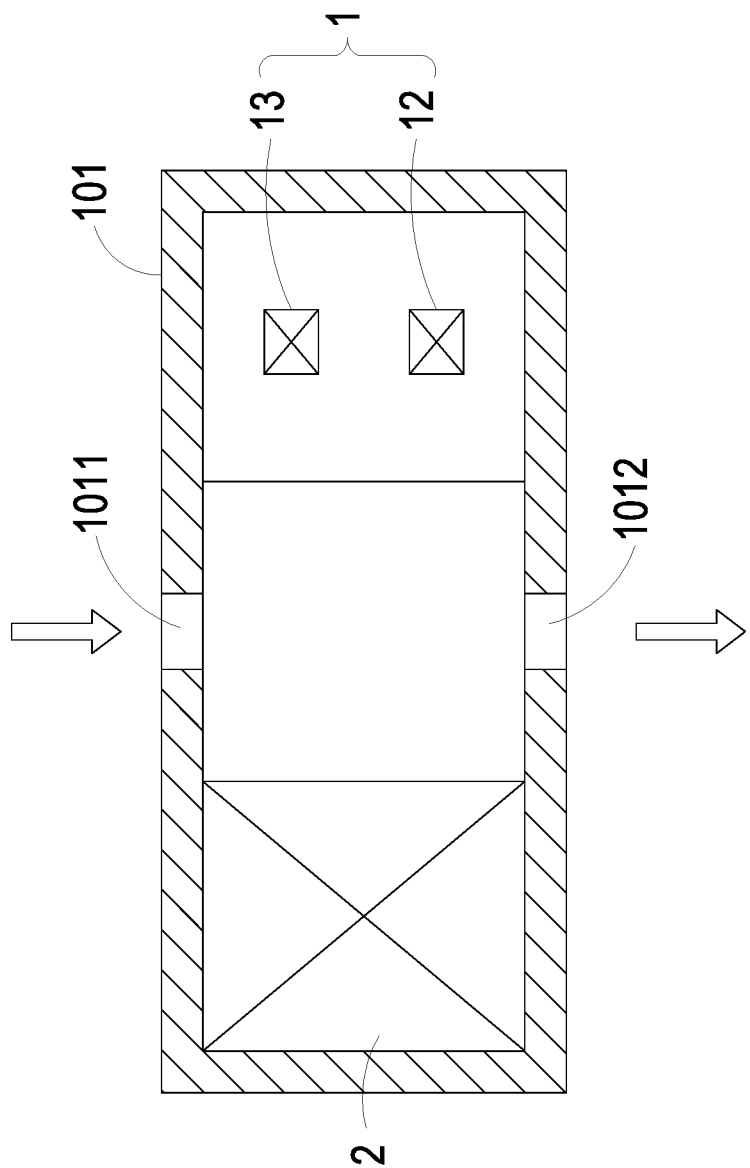
FIG. 1 is a schematic structural view illustrating a portable air cleaning apparatus according to a first embodiment of the present disclosure.
Figure 2:
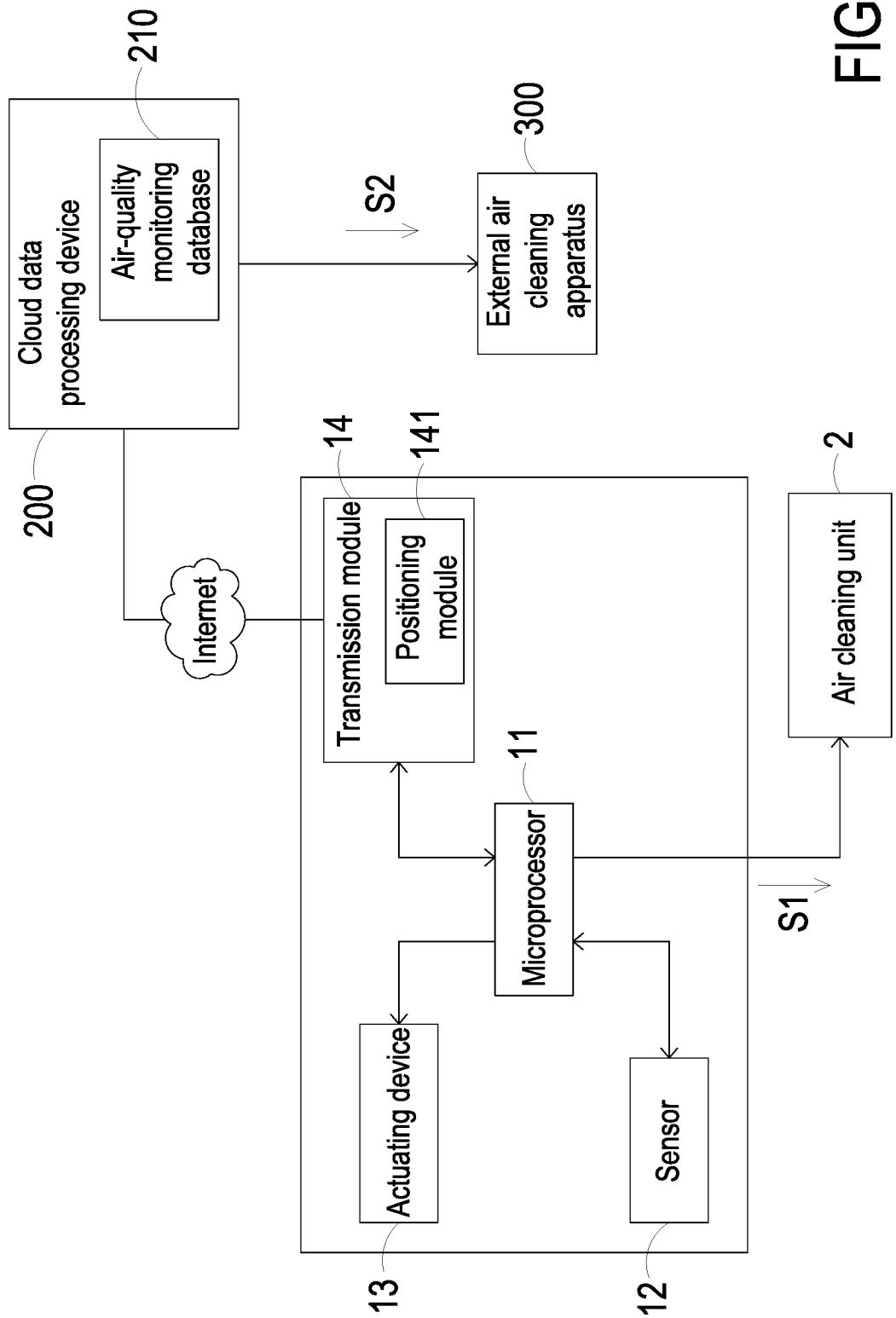
FIG. 2 is a functional block diagram illustrating an actuating and sensing module of an embodiment of the present disclosure.

Please refer to FIGS. 1 and 2. The present disclosure provides a portable air cleaning apparatus 100 including a housing 101, at least one inlet through hole 1011, at least one outlet though hole 1012, at least one actuating and sensing module 1, at least one actuating device 13, at least one air, at least one internal air flow, at least one sensor 12 at least one air-sensing value and at least one air cleaning unit 2. The numbers of the housing 101, the inlet through hole 1011, the outlet through hole 1012, the actuating and sensing module 1, the air, the internal air and the air cleaning unit 2 are exemplified by one for each respectively in the following embodiments but not limited thereto. It is noted that each of the housing 101, the inlet through hole 1011, the outlet through hole 1012, the actuating and sensing module 1, the air, the internal air flow and the air cleaning unit 2 can also be provided in plural numbers.

Please refer to FIG. 1. FIG. 1 is a schematic structural view illustrating a portable air cleaning apparatus according to a first embodiment of the present disclosure. The portable air cleaning apparatus 100 includes a housing 101, an actuating and sensing module 1 and an air cleaning unit 2. The housing 101 includes an inlet through hole 1011 and an outlet through hole 1012 in communication with an external environment. The inlet through hole 1011 and the outlet through hole 1012 are disposed on two opposite sides of the housing 101 and aligned with each other correspondingly, but the present disclosure is not limited thereto. The actuating and sensing module 1 and the air cleaning unit 2 are disposed inside the housing 101, and the air cleaning unit 2 is disposed adjacent to the actuating and sensing module 1. In the embodiment, the air cleaning unit 2 is disposed inside the housing 101 and on one side of the actuating and sensing module 1. In other embodiments of the present disclosure, the air cleaning unit 2 can be disposed to seal the outlet through hole 1012 or disposed inside the actuating and sensing module 1. The present disclosure is not limited thereto.

Please refer to FIG. 2. FIG. 2 is a functional block diagram illustrating an actuating and sensing module of an embodiment of the present disclosure. The actuating and sensing module 1 includes a microprocessor 11, a sensor 12, an actuating device 13 and a transmission module 14. The microprocessor 11 is electrically connected to the sensor 12, the actuating device 13 and the transmission module 14. The microprocessor is further electrically connected to the air cleaning unit 2 to transmit a control signal S1 for controlling the air cleaning unit 2. Thus, the air cleaning unit 2 is controlled to perform operations such as turning on the air cleaning unit 2, turning off the air cleaning unit 2 or adjusting an intensity of cleaning operation.

The actuating device 13 is a driving device capable of driving an operated system in response to a control signal, so that the actuating device 13 can drive air from the external environment to flow into the interior of the housing 101 via the inlet through hole 1011 and inhale the air into the actuating and sensing module 1. An example of the actuating device 13 includes but is not limited to an electric actuating device, a magnetic actuating device, a thermal actuating device, a piezoelectric actuating device, and a fluid actuating device. For example, the electric actuating device is an electric actuating device of a DC motor, an AC motor or a step motor, the magnetic actuating device is an magnetic actuating device of a magnetic coil motor, the thermal actuating device is a thermal actuating device of a heat pump, the piezoelectric actuating device is a piezoelectric actuating device of a piezoelectric pump, and the fluid actuating device is a fluid actuating device of a gas pump or a liquid pump. The present disclosure is not limited thereto. The detailed structure of the actuating device 13 is not redundantly described herein but will be described as follows.

The sensor 12 is disposed adjacent to the actuating device 13, so that at least one target in the air inhaled by the actuating device 13 can be sensed and a corresponding air-sensing value is generated. The sensor 12 can include a sensor such as a temperature sensor, a volatile organic compound sensor (for example, a sensor for sensing the formaldehyde and the ammonia), a particulate sensor (for example, a PM 2.5 particle sensor), a carbon monoxide sensor, a carbon dioxide sensor, an oxygen sensor, an ozone sensor, other gas sensors, a humidity sensor, a moisture sensor, a measuring sensor used for measuring the compounds and/or biological substances in water, other liquids or air (for example, a water quality sensor), other liquid sensors, a light sensor used for measuring the environment, a graphene sensor or a group formed by any combination of the sensors described above, but is not limited thereto. Therefore, the target detected by the sensor 12 can be an inorganic gas or a volatile organic gas, or at least one selected from the group consisting of carbon monoxide, carbon dioxide, sulfur dioxide, nitrogen dioxide, a suspended particle, a fine suspended particle, oxygen, ozone and any combination thereof, and the corresponding air-sensing value is generated accordingly. In the embodiment, the volatile organic compound can be at least one selected from the group consisting of alkenes, alcohols, ketones, benzene rings, halo-alkanes, and nitrogen-containing organic compounds and the corresponding air-sensing value is generated accordingly. In an embodiment, the sensor 12 can also be configured to sense a biomarker, a virus, a bacterium or a microorganism by a direct or indirect method, and the corresponding air-sensing value is generated accordingly, but is not limited thereto.

The transmission module 14 can be a wired transmission module or a wireless transmission module, and includes a positioning module 141 capable of being applied in a GPS satellite positioning system. The transmission module 14 is utilized to transmit and receive the information from an external apparatus through a wired communication path or a wireless communication path. The wired communication path may be established by utilizing an RS485 communication port, an RS232 communication port, a Modbus communication port or a KNX communication port. The wireless communication path may be established by utilizing a Zigbee communication technology, a Z-wave communication technology, an RF communication technology, a Bluetooth communication technology, a Wifi communication technology or an EnOcean communication technology.

The air cleaning unit 2 includes at least one filter, and the filter can be one selected from the group consisting of an activated carbon, a non-woven fabric, an electrostatic air filter and a high-efficiency particulate arrestance (HEPA). Moreover, the air cleaning unit 2 includes at least one selected from the group consisting of a negative ion generator, a sterilizing light generator, a photocatalyst and combinations thereof.

Please refer to FIGS. 1 and 2. When the portable air cleaning apparatus 100 of the present disclosure is turned on, the actuating device 13 of the actuating and sensing module 1 is started to drive air from the external environment to flow into an interior of the housing 101 via the inlet through hole

1011, and the air is inhaled into the actuating and sensing module 1. After flowing through the sensor 12 of the actuating and sensing module 1, the air is discharged out of the housing 101 via the outlet through hole 1012. The actuating, device 13 drives the air to flow in and out continuously and an internal air flow is formed inside the housing 101. The sensor 12 senses the internal air flow constantly and generates at least one air-sensing value. The microprocessor 11 receives the air-sensing value from the sensor 12, and calculates the air-sensing value to generate an air-sensing result by comparing the air-sensing value with a preset standard value. The control signal S1 is transmitted to the air cleaning, unit 2 according to the air-sensing result by the microprocessor 11, so that the air cleaning unit 2 is controlled to perform a turning on operation or a turning off operation. Moreover, in another embodiment, by comparing the air-sensing value with the preset standard value, the air-sensing result generated by the microprocessor 11 further includes a compared value. The microprocessor 11 transmits the control signal S1 to the air cleaning unit 2 according to the compared value, so as to control the air cleaning unit 2 to adjust the intensity of cleaning operation.

For example, the sensor 12 is configured to sense a concentration of the fine suspended particles contained in the internal air flow and generates the corresponding air-sensing value. If the microprocessor 11 compares the air-sensing value with the preset standard value and determines that the air-sensing value is higher than the preset standard value, the microprocessor 11 generates the corresponding air-sensing result being poor air quality. At this time, the microprocessor 11 controls the air cleaning unit 2 to start to filter and clean the air around the portable air cleaning apparatus 100, so as to improve the air quality of the area around the user. At the same time, the sensor 12 senses the internal air flow constantly and generates an instant air-sensing value for the microprocessor 11 to execute a comparison judgment. While the microprocessor 11 determines that the air-sensing value is lower than the preset standard value, the microprocessor 11 generates the corresponding air-sensing result being good air quality. At this time, the microprocessor 11 controls the air cleaning unit 2 to be turned off. In an embodiment, while the microprocessor 11 compares the air-sensing value with the preset standard value, the compared value is further generated. If the compared value is higher than a predetermined value, the microprocessor 11 controls the air cleaning unit 2 according to the compared value, so that the air cleaning unit 2 is controlled to enhance the intensity of cleaning operation. With the above actions, the portable air cleaning device 100 of the present disclosure can achieve the functions of automatically turning on and turning off the air cleaning operation and adjusting the intensity of the air cleaning operation without the user's manual operation.

In an embodiment of the present disclosure, in addition to the above actions, the microprocessor 11 further transmits the air-sensing result to the transmission module 14 at the same time. While the transmission module 14 receives the air-sensing result, the positioning module 141 of the transmission module 14 generates a position data. The air-sensing value and the position data are transmitted together to a cloud data processing device 200 through a communication transmission path. The cloud data processing device 200 can be a computer or any similar device constructed to contain CPU, RAM and other components, and has a data analysis management function. In this embodiment, a server is taken as an example to connect to the transmission module 14 through the Internet, and the information is transmitted and received through a wired or wireless communication transmission path. In this way, the cloud processing device 200 can integrate the air-sensing results with the corresponding position data collected by the portable air cleaning apparatuses 100 of the present disclosure, so as to form an air-quality monitoring database 210. In another embodiment, the cloud data processing device 200 may also transmit a cloud control signal S2 according to the received air-sensing result, so as to control at least one external air cleaning apparatus 300 to perform one operation selected from the group consisting of turning on the external air cleaning apparatus 300, turning off the external air cleaning apparatus 300 and adjusting the intensity of cleaning operation. The external air cleaning apparatus 300 may be any device constructed to improve the air quality such as an air cleaner, a dehumidifier, an exhaust vent fan, an automatic door, an automatic window, an automatic cleaning robot, an air conditioner, etc. The present disclosure is not limited thereto.

The detailed structure of the actuating device 13 is described as follows. In the embodiment, the actuating device 13 of the actuating the sensing module 1 may be a driving structure of a piezoelectric actuating pump or a driving structure of a micro-electro-mechanical system (MEMS) pump. The following is an illustration of the processing actions of a piezoelectric actuating pump taken as an example of the actuating device 13.

Figure 3A:
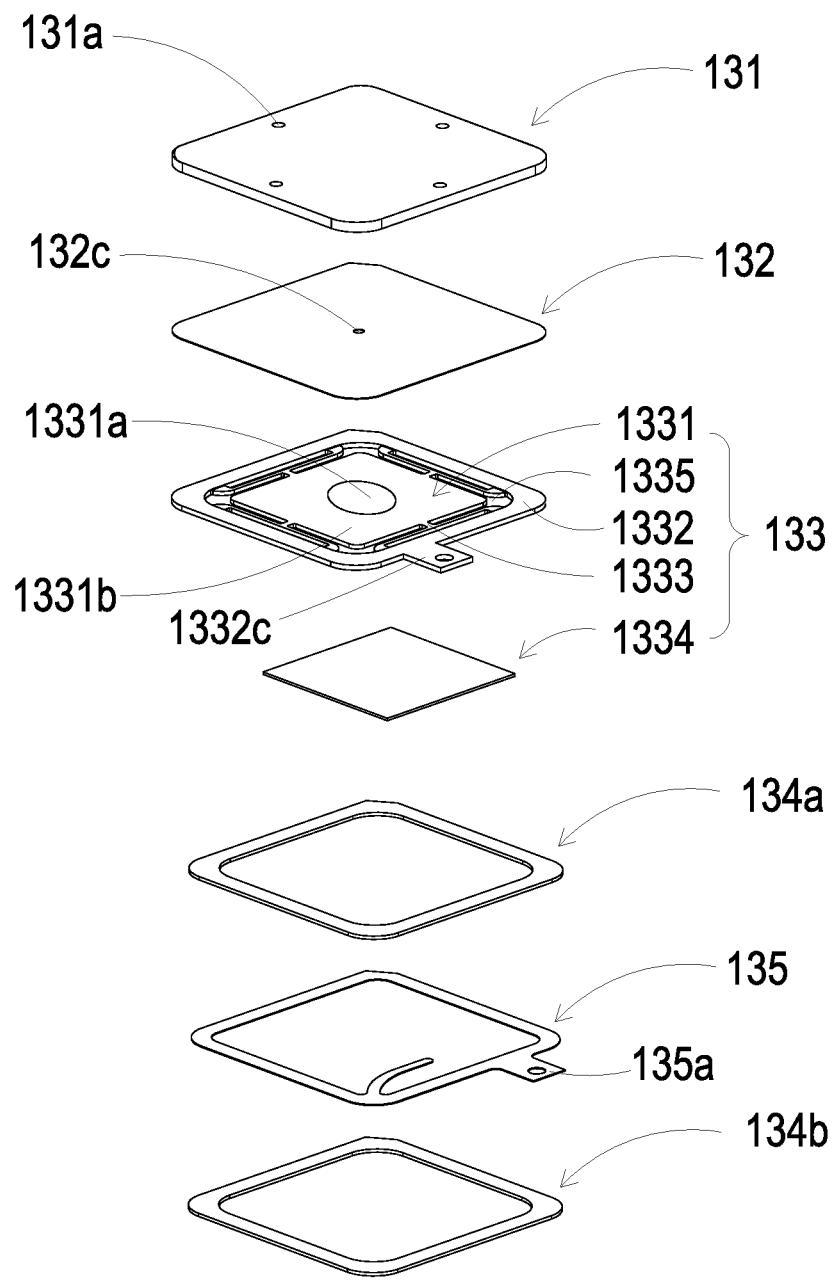
FIG. 3A is a schematic exploded view illustrating an actuating device of the actuating and sensing module according to an embodiment of the present disclosure.
Figure 3B:
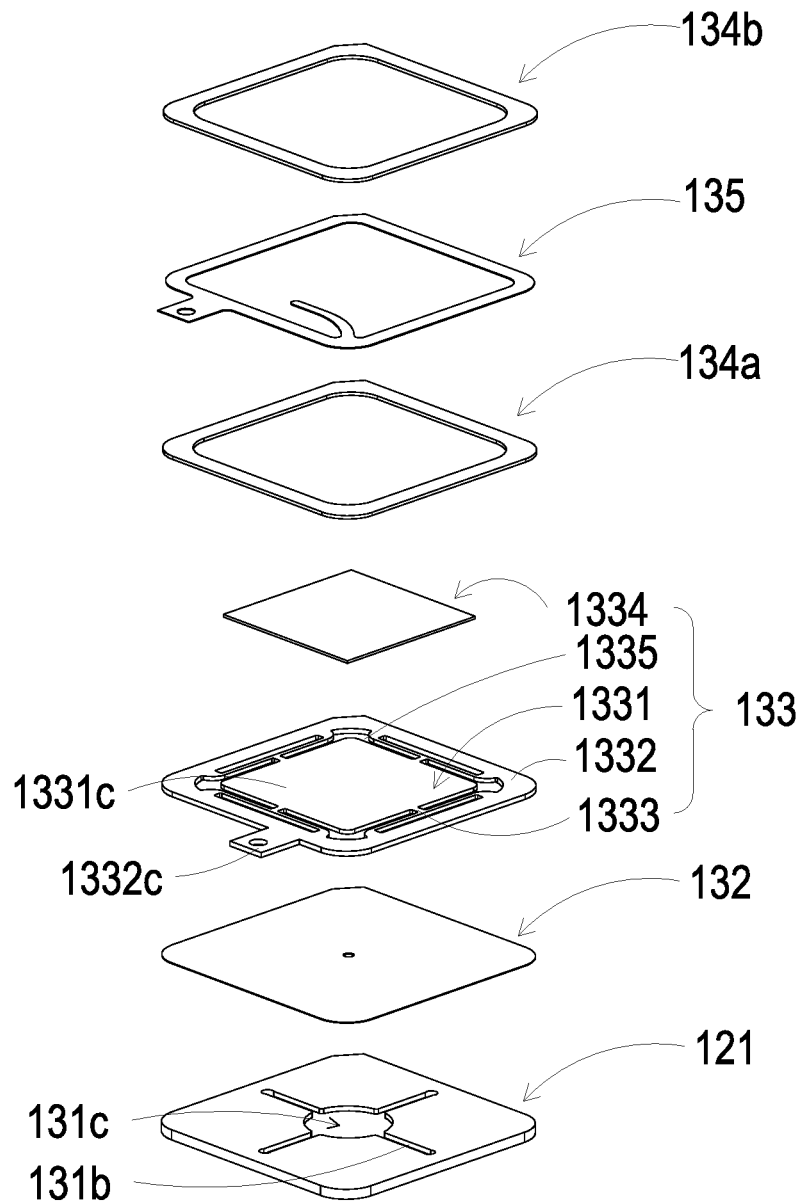
FIG. 3B is another schematic explode view illustrating the actuating device of the actuating and sensing module according the embodiment of the present disclosure at a different viewing angle.
Figure 5:
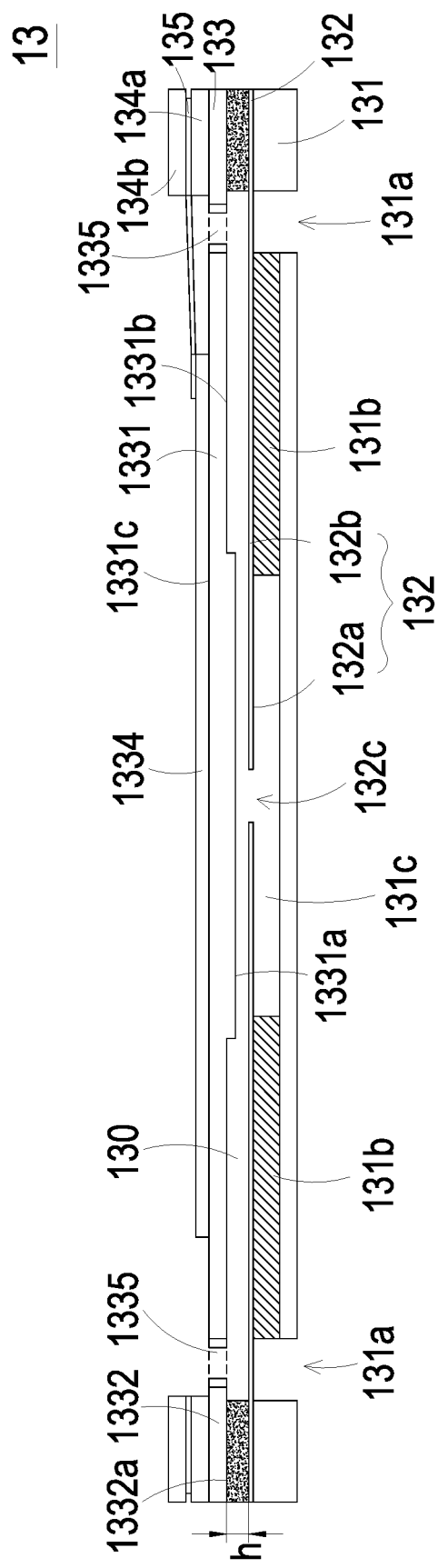
FIG. 5 is a schematic cross-sectional view of the actuating device according to the embodiment of the present disclosure.

Please refer to FIGS. 3A and 3B. FIG. 3A is a schematic exploded view illustrating an actuating device of the actuating and sensing module according to an embodiment of the present disclosure; and FIG. 3B is another schematic explode view illustrating the actuating device of the actuating and sensing module according the embodiment of the present disclosure at a different viewing angle. The actuating device 13 includes an air inlet plate 131, a resonance plate 132, a piezoelectric actuator 133, a first insulation plate 134a, a conducting plate 135 and a second insulation plate 134b. The piezoelectric actuator 133 is aligned with the resonance plate 132. The air inlet plate 131, the resonance plate 132, the piezoelectric actuator 133, the first insulation plate 134a, the conducting plate 135 and the second insulation plate 134b are stacked on each other sequentially. After the above components are combined together, the cross-sectional view of the resulting structure of the actuating device 13 is shown in FIG. 5.

In the embodiment, the air inlet plate 131 has at least one inlet 131a. Preferably but not exclusively, the air inlet plate 131 has four inlets 131a. The inlets 131a run through the air inlet plate 131. In response to the action of the atmospheric pressure, the air can be introduced into the actuating device 13 through the at least one inlet 131a. Moreover, at least one convergence channel 131b is formed on a surface of the air inlet plate 131, and is disposed relative to the at least one inlet 131a on another surface of the air inlet plate 131. Moreover, a central cavity 131c is located at the intersection of the convergence channels 131b. The central cavity 131c is in communication with the at least one convergence channel 131b, such that the air entered by the at least one inlet 131a would be introduced into the at least one convergence channel 131b and is guided to the central cavity 131c. Consequently, the air can be transferred by the actuating device 13. In this embodiment, the at least one inlet 131a, the at least one convergence channel 131b and the central cavity 131c of the air inlet plate 131 are integrally formed in one piece. The central cavity 131c is a convergence chamber for temporarily storing the air. In some embodiments, the air inlet plate 131 may be, for example, made of stainless steel. Moreover, the depth of the convergence chamber defined by the central cavity 131c is equal to the depth of the at least one convergence channel 131b. The resonance plate 132 is made of a flexible material. The resonance plate 132 has a central aperture 132c corresponding to the central cavity 131c of the air inlet plate 131, so as to allow the air to flow therethrough. In other embodiments, the resonance plate 132 may be, for example, made of copper, but not limited thereto.

The piezoelectric actuator 133 includes a suspension plate 1331, an outer frame 1332, at least one bracket 1333 and a piezoelectric plate 1334. The piezoelectric plate 1334 is attached on a first surface 1331c of the suspension plate 1331. In response to an applied voltage, the piezoelectric plate 1334 would be subjected to a deformation. When the piezoelectric plate 1334 is subjected to the deformation, it facilitates a bending vibration of the suspension plate 1331. In this embodiment, the at least one bracket 1333 is connected between the suspension plate 1331 and the outer frame 1332, while the two ends of the bracket 1333 are connected to the outer frame 1332 and the suspension plate 1331 respectively that the bracket 1333 can elastically support the suspension plate 1331. At least one vacant space 1335 is formed among the bracket 1333, the suspension plate 1331 and the outer frame 1332. The at least one vacant space 1335 is in communication with an air flow channel for allowing the air to go through. It has to be emphasized that the type of the suspension plate 1331 and the outer frame 1332 and the type and the number of the at least one bracket 1333 may be varied according to the practical requirements. The outer frame 1332 is arranged around the suspension plate 1331. Moreover, a conducting pin 1332c is protruded outwardly from the outer frame 1332 so as to provide the function of electrical connection, but the present disclosure is not limited thereto.

Figure 4:
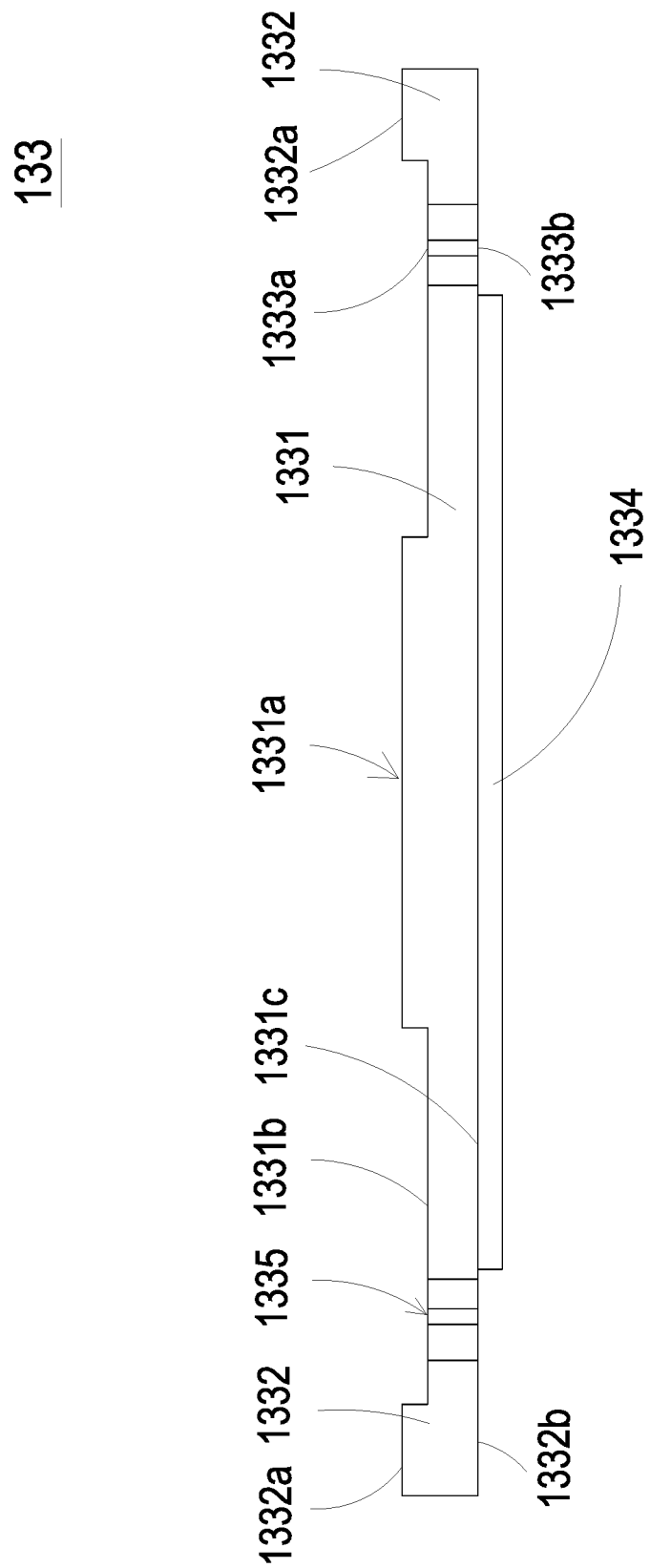
FIG. 4 is a schematic cross-sectional view illustrating a piezoelectric actuator of the actuating device of FIGS. 3A and 3B.

FIG. 4 is a schematic cross-sectional view illustrating a piezoelectric actuator of the actuating device of FIGS. 3A and 3B. As shown in FIG. 4, the suspension plate 1331 has a bulge 1331a that makes the suspension plate 1331 a stepped structure. The bulge 1331a is formed on a second surface 1331b of the suspension plate 1331. The bulge 1331a can be for example but not limited to a circular convex structure. A top surface of the bulge 1331a of the suspension plate 1331 is coplanar with a second surface 1332a of the outer frame 1332, while the second surface 1331b of the suspension plate 1331 is coplanar with a second surface 1333a of the bracket 1333. Moreover, there is a drop of specified amount from the bulge 1331a of the suspension plate 1331 and the second surface 1332a of the outer frame 1332 to the second surface 1331b of the suspension plate 1331 and the second surface 1333a of the bracket 1333. A first surface 1331c of the suspension plate 1331, a first surface 1332b of the outer frame 1332 and a first surface 1333b of the bracket 1333 are coplanar with each other. The piezoelectric plate 1334 is attached on the first surface 1331c of the suspension plate 1331. In some other embodiments, the suspension plate 1331 may be a square plate structure with two flat surfaces, but the type of the suspension plate 1331 may be varied according to the practical requirements. In this embodiment, the suspension plate 1331, the at least bracket 1333 and the outer frame 1332 may be integrally formed and produced from a metal plate, which can be for example but not limited to a stainless steel material. In an embodiment, the length of a side of the piezoelectric plate 1334 is smaller than the length of a side of the suspension plate 1331. In another embodiment, the length of a side of the piezoelectric plate 1334 is equal to the length of a side of the suspension plate 1331. Similarly, the piezoelectric plate 1334 is a square plate structure corresponding to the suspension plate 1331 in terms of design.

Please refer to FIG. 3A. In this embodiment, the actuating device 13 includes the first insulation plate 134a, the conducting plate 135 and the second insulation plate 134b, which are stacked on each other sequentially and located under the piezoelectric actuator 133. The profiles of the first insulation plate 134a, the conducting plate 135 and the second insulation plate 134b substantially match the profile of the outer frame 1332 of the piezoelectric actuator 133. In some embodiments, the first insulation plate 134a and the second insulation plate 134b are made of an insulating material, for example but not limited to a plastic material, so as to provide insulating efficacy. In other embodiments, the conducting plate 135 may be made of an electrically conductive material, for example but not limited to a metallic material, so as to provide electrically conducting efficacy. In this embodiment, the conducting plate 135 may have a conducting pin 135a disposed thereon so as to provide the function of electrical connection.

Please refer to FIG. 5. FIG. 5 is a schematic cross-sectional view of the actuating device according to the embodiment of the present disclosure. In an embodiment, the air inlet plate 131, the resonance plate 132, the piezoelectric actuator 133, the first insulation plate 134a, the conducting plate 135 and the second insulation plate 134b of the actuating device 13 are stacked on each other sequentially. Moreover, there is a gap h between the resonance plate 132 and the outer frame 1332 of the piezoelectric actuator 133. In this embodiment, the gap h between the resonance plate 132 and the outer frame 1332 of the piezoelectric actuator 133 may be filled with a filler, for example but not limited to a conductive adhesive, so that a depth from the resonance plate 132 to the bulge 1331a of the suspension plate 1331 of the piezoelectric actuator 133 can be maintained. The gap h ensures the proper distance between the resonance plate 132 and the bulge 1331a of the suspension plate 1331 of the piezoelectric actuator 133, so that the air can be transferred quickly, the contact interference is reduced and the generated noise is largely reduced. In some embodiments, alternatively, the height of the outer frame 1332 of the piezoelectric actuator 133 is increased, so that the gap is formed between the resonance plate 132 and the piezoelectric actuator 133, but the present disclosure is not limited thereto.

Please refer to FIG. 3A, FIG. 3B and FIG. 5. After the air inlet plate 131, the resonance plate 132 and the piezoelectric actuator 133 are combined together, a movable part 132a and a fixed part 132b of the resonance plate 132 are defined. The convergence chamber for converging the air is further defined by the movable part 132a of the resonance plate 132 and the air inlet plate 131 collaboratively. Moreover, a first chamber 130 is formed between the resonance plate 132 and the piezoelectric actuator 133 for temporarily storing the air. Through the central aperture 132c of the resonance plate 132, the first chamber 130 is in communication with the convergence chamber formed within central cavity 131c of the air inlet plate 131. The peripheral regions of the first chamber 130 are in communication with the air flow channel through the vacant space 1335 between the brackets 1333 of the piezoelectric actuator 133.

Figure 6A:
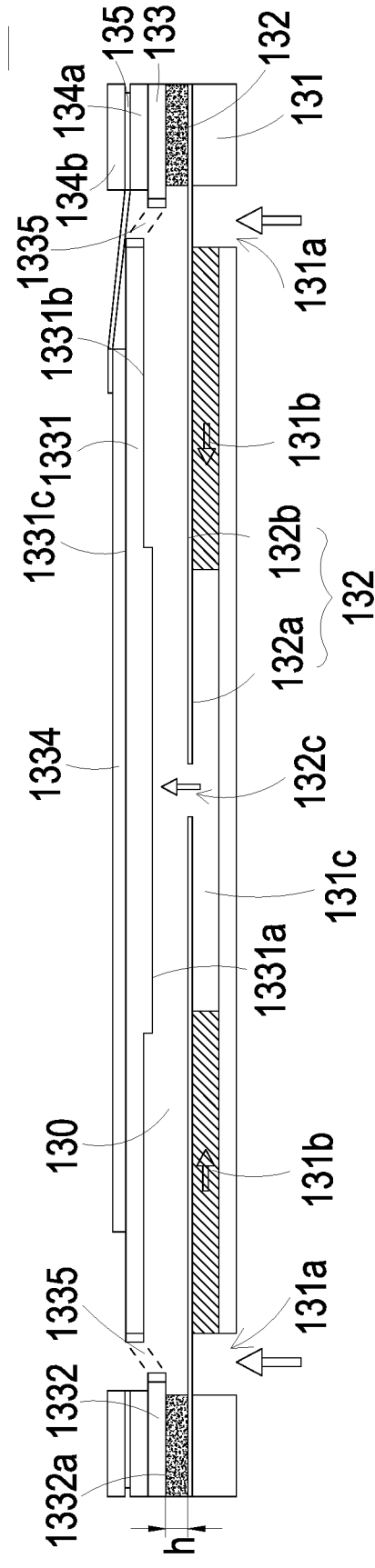
FIGS. 6A to 6E are cross-sectional views illustrating processing actions of the actuating device of the actuating and sensing module according to an embodiment of the present disclosure.
Figure 6B:
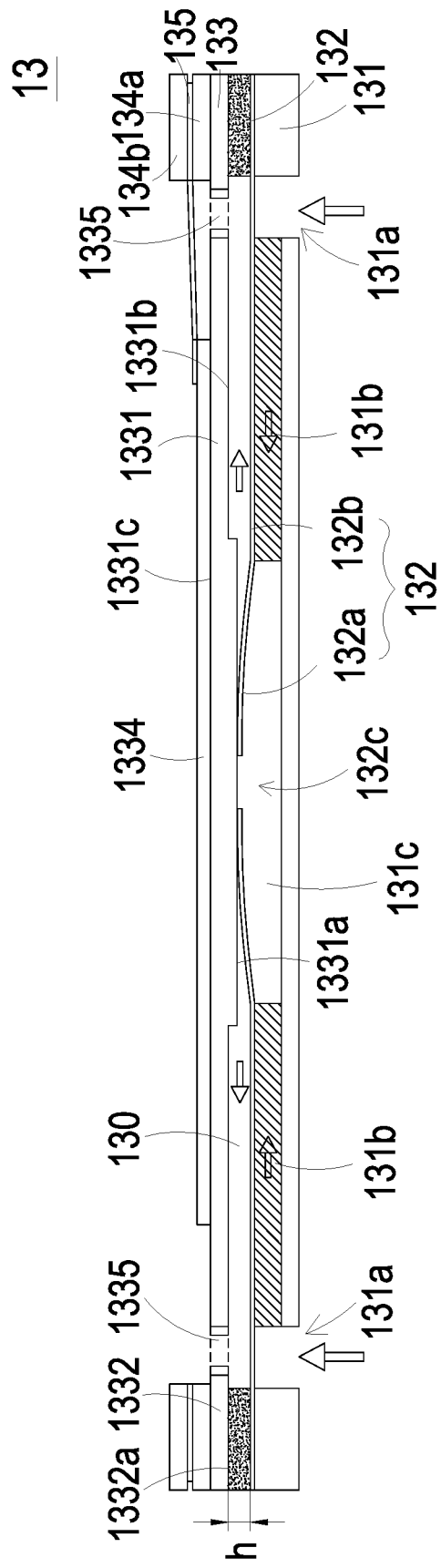
Figure 6C:
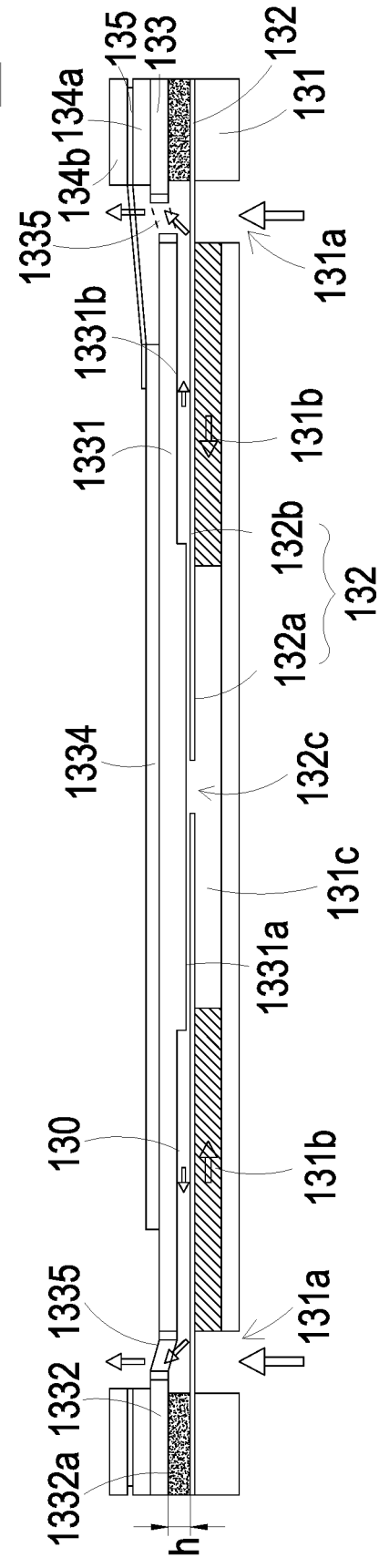
Figure 6D:
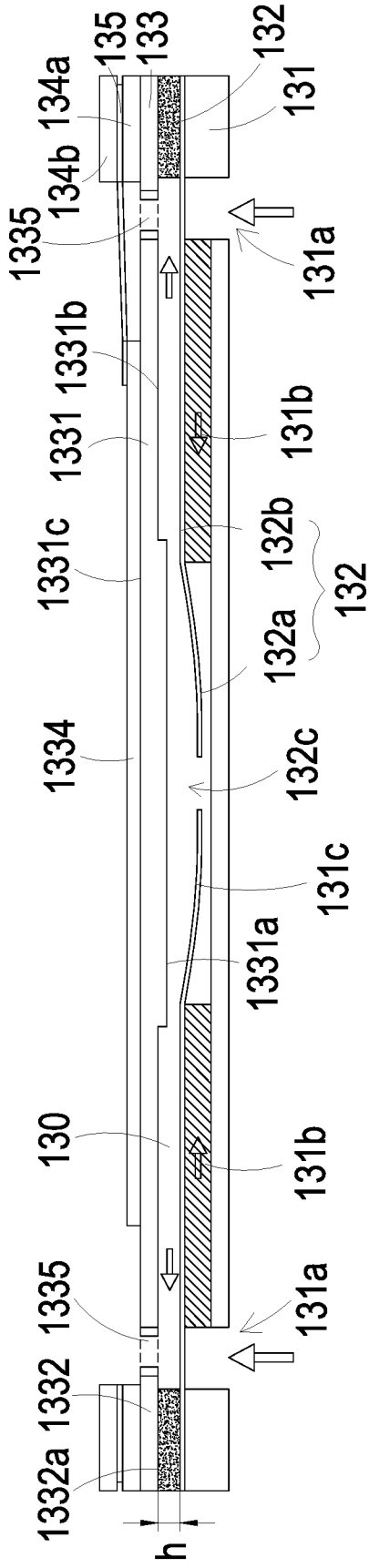
Figure 6E:
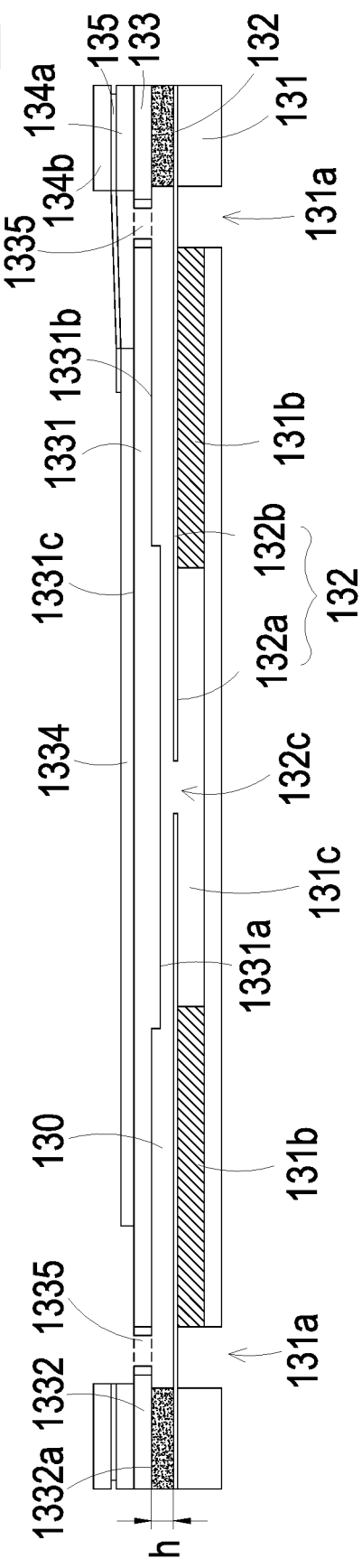

Please refer to FIGS. 3A, 3B, 5 and 6A to 6B. FIGS. 6A to 6E are cross-sectional views illustrating processing actions of the actuating device of the actuating and sensing module according to an embodiment of the present disclosure. Please refer to FIG. 3A, FIG. 3B, FIG. 5 and FIGS. 6A to 6E. The actions of the actuating device 13 will be described as follows. When the actuating device 13 is enabled, the piezoelectric actuator 133 vibrates along a vertical direction in a reciprocating manner by using the bracket 1333 as a fulcrum. Please refer to FIG. 6A, the piezoelectric actuator 133 vibrates downwardly in response to the applied voltage. Since the resonance plate 132 is light and thin, the resonance plate 132 vibrates along the vertical direction in resonance with the piezoelectric actuator 133. More specifically, a region of the resonance plate 132 spatially corresponding to the central cavity 131c of the air inlet plate 131 is also subjected to a bending deformation. The region of the resonance plate 132 corresponding to the central cavity 131c of the air inlet plate 131 is the movable part 132a of the resonance plate 132. When the piezoelectric actuator 133 deforms downwardly during vibration, the movable part 132a of the resonance plate 132 is subjected to the bending deformation because the movable part 132a of the resonance plate 132 is pushed by the air and vibrates in response to the piezoelectric actuator 133. In response to the downward deformation of the piezoelectric actuator 133 during vibration, the air is fed into the at least one inlet 131a of the air inlet plate 131. Then, the air is transferred to the central cavity 131c of the air inlet plate 131 through the at least one convergence channel 131b. Then, the air is transferred through the central aperture 132c of the resonance plate 132 spatially corresponding to the central cavity 131c, and introduced downwardly into the first chamber 130. As the piezoelectric actuator 133 is enabled, the resonance plate 132 is in resonance with the piezoelectric actuator 133. Consequently, the resonance plate 132 vibrates along the vertical direction in the reciprocating manner. As shown in FIG. 6B, during the vibration of the movable part 132a of the resonance plate 132 at this stage, the movable part 132a of the resonance plate 132 moves down to contact and attach on the bulge 1331a of the suspension plate 1331 of the piezoelectric actuator 133, and a distance from the fixed part 132b of the resonance plate 132 to a region of the suspension plate 1331 except the bulge 1331a remains the same. Owing to the deformation of the resonance plate 132 described above, a middle communication space of the first chamber 130 is closed, and the volume of the first chamber 130 is compressed. Under this circumstance, the pressure gradient occurs to push the air in the first chamber 130 moving toward peripheral regions of the first chamber 130 and flowing downwardly through the vacant space 1335 of the piezoelectric actuator 133. Referring to FIG. 6C, the movable part 132a of the resonance plate 132 returns to its original position when the piezoelectric actuator 133 deforms upwardly during vibration. Consequently, the volume of the first chamber 130 is continuously compressed to generate the pressure gradient which makes the air in the first chamber 130 continuously pushed toward peripheral regions. Meanwhile, the air is continuously fed into the at least one inlet 131a of the air inlet plate 131, and transferred to the central cavity 131c. Then, as shown in FIG. 6D, the resonance plate 132 moves upwardly, which is cause by the resonance of the upward motion of the piezoelectric actuator 133. That is, the movable part 132a of the resonance plate 132 is also vibrated upwardly. Consequently, it decreases the flow of the air from the at least one inlet 131a of the air inlet plate 131 into the convergence chamber formed within the central cavity 131c. At last, as shown in FIG. 6E, the movable part 132a of the resonance plate 132 has returned to its original position. As the embodiments described above, when the resonance plate 132 vibrates along the vertical direction in the reciprocating manner, the gap h between the resonance plate 132 and the piezoelectric actuator 133 is helpful to increase the maximum displacement along the vertical direction during the vibration. In other words, the configuration of the gap h between the resonance plate 132 and the piezoelectric actuator 133 can increase the amplitude of vibration of the resonance plate 132. Consequently, a pressure gradient is generated in the air flow channels of the actuating device 13 to facilitate the air to flow at a high speed. Moreover, since there is an impedance difference between the feeding direction and the exiting direction, the air can be transmitted from the inlet side to the outlet side. Even if a gas pressure exists at the outlet side, the actuating device 13 still has the capability of pushing the air to the air flow channel while achieving the silent efficacy. The steps of FIGS. 6A to 6E may be done repeatedly. Consequently, the ambient air is transferred by the actuating device 13 from the outside to the inside.

From the above descriptions, the present disclosure provides a portable air cleaning apparatus, which utilizes the actuating device of the actuating and sensing module to drive the air to flow through the sensor via the inlet through hole, so that the sensor can sense the received air. Therefore, the air can be guided to the sensor which is provided with the amount of the air stably and uniformly by the fluid actuating device. Thus, the monitoring response time of the sensor can be reduced, the air can be monitored with precision and the stability and the accuracy of the air sensing are improved greatly. Moreover, the air cleaning unit is disposed adjacent to the actuating and sensing module to clean the air. Therefore, by applying the above-mentioned innovative actuating and sensing module to a portable air cleaning apparatus, the air quality of the surrounding environment can be monitored and the ambient air can be automatically cleaned in response thereto. It achieves the effect of ensuring the air quality of the user's surrounding environment to be maintained anywhere and at any time. The present disclosure is extremely valuable for industrial use.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:
1. A portable air cleaning apparatus, comprising:
a housing comprising an inlet through hole and an outlet through hole in communication with an external environment;
an actuating and sensing module disposed inside the housing and comprising:
at least one actuating device driving air from the external environment to flow into an interior of the housing via the inlet through hole and discharge the air via the outlet through hole, so as to form an internal air flow, wherein the at least one actuating device is a piezoelectric actuating pump, the piezoelectric actuating pump further comprises:
an air inlet plate having at least one inlet, at least one convergence channel and a central cavity defining a convergence chamber, wherein the at least one inlet allows the air to flow in, and wherein the convergence channel is in communication with the inlet and guides the air from the inlet toward the convergence chamber defined by the central cavity;

a resonance plate having a central aperture and a movable part, wherein the central aperture is aligned with the convergence chamber and the movable part surrounds the central aperture; and a piezoelectric actuator aligned with the resonance plate; and at least one sensor disposed adjacent to the actuating device to sense the air to generate an air-sensing value; and an air cleaning unit disposed adjacent to the actuating and sensing module to clean the air.

2. The portable air cleaning apparatus according to claim 1, wherein the actuating and sensing module further comprises a microprocessor electrically connected to the actuating device, the sensor and the air cleaning unit, wherein the microprocessor receives the air-sensing value from the sensor and calculates the air-sensing value to generate an air-sensing result by comparing the air-sensing value with a preset standard value, and a control signal is transmitted to the air cleaning unit according to the air-sensing result, so as to control one of operations of turning on and turning off the air cleaning unit.

3. The portable air cleaning apparatus according to claim 2, wherein the microprocessor calculates the air-sensing value to generate a compared value by comparing the air-sensing value with the preset standard value, and the microprocessor transmits the control signal to the air cleaning unit according to the compared value, so as to control the air cleaning unit to adjust an intensity of cleaning operation.

4. The portable air cleaning apparatus according to claim 2, wherein the actuating and sensing module comprises a transmission module, and the transmission module is electrically connected to the microprocessor, wherein the microprocessor transmits the air-sensing value to the transmission module and the transmission module transmits the air-sensing value to a cloud data processing device through a communication transmission path, wherein the cloud data processing device controls at least one external air cleaning apparatus according to the air-sensing value to perform one operation selected from the group consisting of turning on the external air cleaning apparatus, turning off the external air cleaning apparatus and adjusting an intensity of cleaning operation.

5. The portable air cleaning apparatus according to claim 4, wherein the transmission module is one of a wired transmission module and a wireless transmission module.

6. The portable air cleaning apparatus according to claim 1, wherein the air cleaning unit comprises at least one filter.

7. The portable air cleaning apparatus according to claim 6, wherein the filter is one selected from the group consisting of an activated carbon, a non-woven fabric, an electrostatic air filter and a high-efficiency particulate arrestance.

8. The portable air cleaning apparatus according to claim 1, wherein the air cleaning unit comprises at least one selected from the group consisting of a negative ion generator, a sterilizing light generator, a photocatalyst and combinations thereof.

9. The portable air cleaning apparatus according to claim 1, wherein the air contains one selected from the group consisting of carbon monoxide, carbon dioxide, sulfur dioxide, nitrogen dioxide, suspended particle, fine suspended particle, oxygen, ozone and combinations thereof.

10. The portable air cleaning apparatus according to claim 1, wherein the air contains a volatile organic compound, wherein the volatile organic compound is one selected from the group consisting of alkenes, alcohols, ketones, benzene rings, halo-alkanes and nitrogen-containing organic compounds.

11. The portable air cleaning apparatus according to claim 1, wherein the air contains one selected from the group consisting of an inorganic gas, a biomarker, a virus, a bacterium and a microorganism.

12. The portable air cleaning apparatus according to claim 1, wherein the sensor comprises at least one selected from the group consisting of an oxygen sensor, a carbon monoxide sensor, a carbon dioxide sensor, a temperature sensor, a liquid sensor, a moisture sensor, an ozone sensor, a fine particle sensor, a volatile organic compound sensor, a light sensor and combinations thereof.

13. The portable air cleaning apparatus according to claim 1, wherein the sensor comprises a graphene sensor.

14. The portable air cleaning apparatus according to claim 1, wherein the actuating and sensing module comprises a transmission module having a positioning module, and the positioning module generates a position data, wherein the transmission module transmits the air-sensing value and the position data to a cloud data processing device through a communication transmission path, so as to form an air-quality monitor database.

15. The portable air cleaning apparatus according to claim 1,
wherein a gap is formed between the resonance plate and the piezoelectric actuator to define a first chamber, so that the air from the at least one inlet of the air inlet plate is converged to the central cavity along the at least one convergence channel and flows into the first chamber through the central aperture of the resonance plate when the piezoelectric actuator is enabled, whereby the air is further transferred through a resonance between the piezoelectric actuator and the movable part of the resonance plate.

16. The portable air cleaning apparatus according to claim 1,
wherein the piezoelectric actuator comprises:
a suspension plate being a square suspension plate and having a first surface, an opposing second surface and a bulge, wherein the suspension plate is permitted to undergo a bending vibration;
an outer frame arranged around the suspension plate;
at least one bracket connected between the suspension plate and the outer frame for elastically supporting the suspension plate; and
a piezoelectric plate, wherein a length of a side of the piezoelectric plate is smaller than or equal to a length of a side of the suspension plate, and the piezoelectric plate is attached on the first surface of the suspension plate, wherein when a voltage is applied to the piezoelectric plate, the suspension plate is driven to undergo the bending vibration,
wherein the piezoelectric actuating pump comprises a conducting plate, a first insulation plate and a second insulation plate, and the air inlet plate, the resonance plate, the piezoelectric actuator, the first insulation plate, the conducting plate and the second insulation plate are sequentially stacked on each other.

17. A portable air cleaning apparatus, comprising:
at least one housing comprising at least one inlet through hole and at least one outlet through hole in communication with an external environment;
at least one actuating and sensing module disposed inside the housing and comprising:

at least one actuating device driving at least one air from the external environment to flow into an interior of the housing through the inlet through hole and discharge the air through the outlet through hole, so as to form at least one internal air flow, wherein the at least one actuating device is at least one piezoelectric actuating pump, the at least one piezoelectric actuating pump further comprises:

at least one air inlet plate having at least one inlet, at least one convergence channel and at least one central cavity defining at least one convergence chamber, wherein the at least one inlet allows the air to flow in, and wherein the at least one convergence channel is in communication with the at least one inlet and guides the air from the at least one inlet toward the at least one convergence chamber defined by the at least one central cavity;

at least one resonance plate having at least one central aperture and at least one movable part, wherein the at least one central aperture is aligned with the at least one convergence chamber and the at least one movable part surrounds the at least one central aperture; and at least one piezoelectric actuator aligned with the at least one resonance plate; and at least one sensor disposed adjacent to the actuating device to sense the air to generate at least one air-sensing value; and at least one air cleaning unit disposed adjacent to the actuating and sensing module to clean the air.

* * * * *